US010338590B2

(12) United States Patent
Lazarevych

(10) Patent No.: US 10,338,590 B2
(45) Date of Patent: Jul. 2, 2019

(54) TRAJECTORY PLANNING METHOD FOR ASCERTAINING A CONTROL PROFILE FOR A MOTOR VEHICLE

(71) Applicant: Bayerische Motoren Werke Aktiengesellschaft, Munich (DE)

(72) Inventor: Olexiy Lazarevych, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 57 days.

(21) Appl. No.: 15/472,352

(22) Filed: Mar. 29, 2017

(65) Prior Publication Data

US 2017/0199524 A1      Jul. 13, 2017

Related U.S. Application Data

(63) Continuation of application No. PCT/EP2015/071649, filed on Sep. 22, 2015.

(30) Foreign Application Priority Data

Oct. 1, 2014    (DE) .................. 10 2014 219 936

(51) Int. Cl.
   *G05D 1/02*      (2006.01)
   *G05D 1/00*      (2006.01)
   (Continued)

(52) U.S. Cl.
   CPC .......... *G05D 1/0088* (2013.01); *B60W 30/06* (2013.01); *B60W 40/10* (2013.01); *B62D 15/025* (2013.01);
   (Continued)

(58) Field of Classification Search
   CPC .............................................. B60W 30/18163
   See application file for complete search history.

(56) References Cited

U.S. PATENT DOCUMENTS

2012/0290131 A1    11/2012  Khoukhi
2013/0035773 A1     2/2013  Wang et al.
(Continued)

FOREIGN PATENT DOCUMENTS

DE   10 2005 056 211 A1    6/2007
WO   WO 2011/059914 A1    5/2011
WO   WO 2014/009631 A1    1/2014

OTHER PUBLICATIONS

International Search Report (PCT/ISA/210) issued in PCT Application No. PCT/EP2015/071649 dated Nov. 25, 2015 with English translation (Four (4) pages).

(Continued)

*Primary Examiner* — Genna M Mott
(74) *Attorney, Agent, or Firm* — Crowell & Moring LLP

(57) ABSTRACT

A trajectory planning method ascertains a control profile for a motor vehicle, in particular for a self-driving motor vehicle. The method includes the acts of: providing a first position set and a second position set, the first position set having at least one piece of information relating to a starting condition at a trajectory start and the second position set having at least one piece of information relating to an end condition at a trajectory end; providing a first and a second control set, the first control set having at least one piece of information relating to a first control state of the motor vehicle at the trajectory start and the second control set having at least one piece of information relating to a second control state of the motor vehicle at the trajectory end; providing a vehicle movement modeling function which has a kinematic movement model of the motor vehicle; providing a solver; ascertaining a control profile information set, which has two profile information values that are indicative of the trajectory, by using the solver on the vehicle movement modeling function dependent on the first and second position set and the first and second control set; and deter-
(Continued)

mining a control profile for the motor vehicle dependent on the control profile information set.

14 Claims, 5 Drawing Sheets

(51) Int. Cl.
  *B62D 15/02* (2006.01)
  *B60W 30/06* (2006.01)
  *B60W 40/10* (2012.01)

(52) U.S. Cl.
  CPC ............. *B62D 15/027* (2013.01); *G05D 1/02* (2013.01); *G05D 1/0212* (2013.01); *B60W 2510/20* (2013.01); *B60W 2520/06* (2013.01); *B60W 2520/10* (2013.01); *B60W 2710/20* (2013.01); *B60W 2720/10* (2013.01); *B60W 2720/24* (2013.01)

(56) References Cited

U.S. PATENT DOCUMENTS

| | | | |
|---|---|---|---|
| 2015/0185734 A1 | 7/2015 | Minoiu-Enache | |
| 2015/0355641 A1* | 12/2015 | Choi | G05D 1/021 701/23 |
| 2016/0001774 A1* | 1/2016 | Nakada | B60W 10/04 701/22 |
| 2017/0129486 A1* | 5/2017 | Nakada | B60W 30/06 |

OTHER PUBLICATIONS

German-language Written Opinion (PCT/ISA/237) issued in PCT Application No. PCT/EP2015/071649 dated Nov. 25, 2015 (Six (6) pages).

German-language Search Report issued in counterpart German Application No. 10 2014 219 936.0 dated Jun. 26, 2015 with partial English translation (Fourteen (14) pages).

\* cited by examiner

100

TRAJECTORY PLANNING METHOD FOR ASCERTAINING A CONTROL PROFILE FOR A MOTOR VEHICLE

CROSS REFERENCE TO RELATED APPLICATIONS

This application is a continuation of PCT International Application No. PCT/EP2015/071649, filed Sep. 22, 2015, which claims priority under 35 U.S.C. § 119 from German Patent Application No. 10 2014 219 936.0, filed Oct. 1, 2014, the entire disclosures of which are herein expressly incorporated by reference.

BACKGROUND AND SUMMARY OF THE INVENTION

The present invention relates to a path generation for a motor vehicle.

A path, also called a trajectory, is required for traveling from a starting location to a destination location, along which path a motor vehicle can move. In a conventional manner, current 2D path generators select, from a number of trajectories originating from within predefined boundary conditions, by means of a cost function, that trajectory which meets the cost function in the best manner possible. However, this approach has numerous limitations. Thus, there may be one or more better trajectories which, under the predefined boundary conditions, would be a better trajectory for the path generation, but which are not contained in the number of trajectories. It is further not possible to reliably predict whether the corresponding motor vehicle in general has the physical possibilities of driving along the trajectory determined to be the best possible path. In the case of an autonomously driving motor vehicle, in the following, also called an autonomous vehicle, it is not possible to ensure by the current methods that it is taken into account for the motor vehicle movement whether corresponding actuators to be controlled for the movement of the motor vehicle can be controlled in such a manner that an acceptable direction and/or acceleration change can be carried out.

Problems may further occur in the case of the previously used methods because the resulting final conditions of the actuators are possibly not suitable for continuing the movement in the desired manner. It could happen, for example, that, although the predefined position and orientation of the vehicle are reached on a straight road at the end of the trajectory, the steering may not be in the desired (neutral) position. It would then not be easily possible to stay in the trajectory that follows.

It would therefore be desirable to provide a possibility that eliminates or at least reduces at least one of the above-mentioned limitations.

It is an object of the invention to provide a method which avoids or at least reduces at least some of the disadvantages known in the state of the art.

According to the invention, this object is achieved by a method in accordance with embodiments of the invention.

The object in this case relates to a trajectory planning method for ascertaining a control profile for a motor vehicle, particularly for an autonomously driving motor vehicle. The method has the steps of providing a first position set, the first position set having at least one piece of information with respect to a starting condition at a trajectory start of the trajectory; providing a second position set, wherein the second position set has at least one piece of information with respect to an end condition at a trajectory end of the trajectory; providing a first control set, wherein the first control set has at least one piece of information with respect to a control condition of the motor vehicle at the trajectory start; providing a second control set, wherein the second control set has at least one piece of information with respect to a control condition of the motor vehicle at the trajectory end; providing a vehicle movement modeling function, wherein the vehicle movement modeling function has a kinematic movement model of the motor vehicle; providing a solver ascertaining a control profile information set by applying the solver to the vehicle movement modeling function dependent on the first position set, of the second position set, of the first control set and of the second control set, wherein the control profile information set has two profile information values, and wherein the profile information values are indicative of the trajectory; and determining a control profile for the motor vehicle dependent on the control profile information set, wherein the control profile is indicative of the trajectory.

For the purpose of the invention, a position set may be a set of information which describes the start and the end of a trajectory. As a result, this information may be indicative of the position of a motor vehicle at the start and at the end of the travel along this trajectory.

A trajectory for the purpose of the invention may be a virtual path which is indicative of the route to be covered by a motor vehicle.

In particular, a trajectory can determine which path a motor vehicle is to take. This can particularly be achieved by a plurality of trajectories which can be placed in a mutually adjoining fashion.

For the purpose of the invention, a control set may be a set of information that could be used for controlling actuators of a motor vehicle, in order to move the motor vehicle into a desired direction.

A control condition for the purpose of the invention may be a condition in which an actuator of the motor vehicle is situated. Such a control condition may correspond to a corresponding information of the control set at a defined point in time.

For the purpose of the invention, a vehicle movement modeling function may be a function which can model the movement of a motor vehicle. In a simple case, the vehicle movement modeling function may be an analytical function. In more complex cases, the vehicle movement modeling function may be a non-analytical function. Several functions may also be described for imaging the vehicle movement model, which functions jointly result in the vehicle movement modeling function.

For the purpose of the invention, a kinematic movement model of the motor vehicle may be part of the vehicle movement modeling function. In this case, the kinematic movement model can image the acceleration and braking behavior of a specific motor vehicle or motor vehicle model. Furthermore, additional movement information of the motor vehicle can be imaged in the kinematic model. In a simple case, the kinematic movement model may have one or more analytical functions. In more complex cases, the kinematic movement model may also have one or more non-analytical functions.

For the purpose of the invention, a solver may be a special mathematical program, which can be used for solving a special mathematical problem. For solving a problem, the solver can provide an analytical as well as a numerical approach. Preferably, the solver is a mathematical program which can numerically solve the respective problem.

A control profile according to the invention can carry out the controlling in order to preferably move the motor vehicle along a defined trajectory implicitly contained in the control profile. The control profile may, for example, be a dataset of control-profile-specific information. However, the control profile may also have mathematical functions, from which control information for the motor vehicle control can be determined dependent on the time. The control profile may also have a picture representation of a time-dependent function, from which control information or control values required for the motor vehicle control can be ascertained dependent on the time.

By means of the teaching according to the invention, the advantage is achieved, that a trajectory can be ascertained which can also actually be driven by the motor vehicle.

Before further developments of the invention are discussed in greater detail in the following, it should be noted that the invention is not limited to the described components or the described process steps. Furthermore, the used terminology also represents no limitation but is used only in the manner of an example. To the extent that the singular is used in the specification and in the claims, this also, in each case, comprises the plural, if not explicitly excluded by the context.

The embodiments of the invention may be implemented in various forms of hardware, software, firmware, special purpose processors, or a combination thereof. Aspects of the present invention may be implemented in software as a program tangibly embodied on a program storage device. The program may be a uploaded to, executed by, a machine having any suitable architecture. The machine may be implemented on a computer platform having hardware such as one or more processing units, random access memory, and input/output interfaces. The trajectory planning method that determines the control profile may be executed onboard the motor vehicle, particularly an autonomously driven motor vehicle Further embodiments of the device according to the invention will be explained in the following.

Corresponding to a first embodiment, the method provides that the first position set has two spatial coordinates and a direction information, the spatial coordinates being indicative of a spatial position of the trajectory at the trajectory start, and wherein the direction information is indicative of a tangent of the trajectory at the trajectory start. The method further provides that the second position set has two spatial coordinates and a direction information, wherein the spatial coordinates are indicative of a spatial position of the trajectory at the trajectory end, and wherein the direction information is indicative of a tangent of the trajectory at the trajectory end.

For the purpose of the invention, a spatial coordinate is an axis designation in a coordinate system. In this case, the coordinate system can usually be selected arbitrarily. For example, a coordinate system with polar coordinates can be selected, as can a coordinate system with non-orthogonal basis vectors. It preferably is a Cartesian coordinate system. In this case, the coordinate system can be used for locally describing a motor vehicle position.

For the purpose of the invention, a direction information is an information concerning an alignment of the motor vehicle in the corresponding location in the space.

In this manner, the beginning of a trajectory can be defined as a motor vehicle position and a motor vehicle alignment at the start of the trajectory. Likewise, the end of the trajectory can be defined as a motor vehicle position and a motor vehicle alignment at the end of the trajectory.

This further development has the advantage that thereby, in a simple and precise manner, the spatial position and spatial alignment of the motor vehicle can be indicated at the desired starting and destination location. Thus, the alignment of the motor vehicle at the corresponding location can be indicated for the route to be traveled, thus the trajectory to be traveled, at the start of the route as well as at the end of the route.

Corresponding to an additional embodiment, the method further provides that the first control set has a first control information which is indicative of a position related to the steering of the motor vehicle at the trajectory start. The method further provides that the second control set has a second control information which is indicative of the position related to the steering of the motor vehicle at the trajectory end.

For the purpose of the invention, the position related to the steering is a control variable which is required for the steering of the motor vehicle. In the simplest case, this may be the angular position of a steering wheel of the motor vehicle. However, the position related to the steering may also be a control variable, for example, an angle of an actuator, to which one or more wheels of the motor vehicle are set or are to be set individually or in pairs.

This embodiment has the advantage that a direct relationship can be established between the trajectory to be driven by the motor vehicle and the motor vehicle steering.

Corresponding to a further embodiment, the method also comprises the steps of dividing the trajectory into a first region and into a second region. In this case, the first region is indicative of an approach phase of the motor vehicle to the trajectory end. In this case, the second region is indicative of a correction phase of the motor vehicle before reaching the trajectory end.

For the purpose of the invention, an approach phase is a first phase of a drive along a route. The approach phase can be modeled according to a natural human driving behavior, particularly a steering behavior and/or acceleration behavior which a driver of the motor vehicle would exhibit for reaching a destination location.

A correction phase according to the invention is a further phase of the drive along the route. In this case, the correction phase can be modeled according to a natural human driving behavior, particularly a steering behavior and/or acceleration behavior, which a driver of the motor vehicle would exhibit in the proximity of the destination location to be reached.

This embodiment has the advantage that the trajectory to be driven can indirectly correspond to a simulation of a motor vehicle driver's natural driving behavior.

Corresponding to a further embodiment, the method also provides that the first profile information value is situated in the approach phase, and that the second profile information value is situated in the correction phase.

This embodiment has the advantage that a control profile can thereby be ascertained which can be modeled according to a motor vehicle driver's natural driving behavior.

Corresponding to a further embodiment, the method also provides that the first profile information value of the control profile information set is indicative of a first point with a horizontal tangent of the control profile, and that the second profile information value of the control profile information set is indicative of a second point with a horizontal tangent of the control profile.

For the purpose of the invention, a point with a horizontal tangent is a point or a location of a mathematical function or curve, which has a slope of zero.

This embodiment has the advantage that it can provide a possibility by which the first region can be differentiated from the second region.

This permits a better simulating of a motor vehicle driver's corresponding natural driving behavior.

Corresponding to a further embodiment, the method provides that the control profile information set has a third profile information value. The third profile information value is indicative of a route of the trajectory.

For the purpose of the invention, a route of the trajectory is the total path of the trajectory. The latter may correspond to the path length to be covered by the motor vehicle in order to drive along the entire trajectory.

This embodiment has the advantage that the motor vehicle can utilize the path length of the trajectory for the determination of the control profile. The control profile can therefore still better model a human driving behavior, preferably an optimal human driving behavior, for the path to be traveled.

Corresponding to a further embodiment, the method further provides that the first control set has a third control information, which is indicative of a speed of the motor vehicle at the trajectory start. Furthermore, the method provides that the second control set has a fourth control information, which is indicative of a speed of the motor vehicle at the trajectory end.

This embodiment has the advantage that several mutually successive trajectories can be determined which, in a simple manner, can be directly connected with one another, because, as a result, the speed at the trajectory end of a first trajectory can be selected to be identical to the speed of a further trajectory to be connected thereto at the trajectory start of the additional trajectory.

Corresponding to a further embodiment, the method provides that the first control set has a fifth control information, which is indicative of a steering rate of the motor vehicle at the trajectory start. The method further provides that the second control set has a sixth control information which is indicative of a steering rate of the motor vehicle at the trajectory end.

A steering rate for the purpose of the invention is a time-dependent change of the steering position, thereby a rate of change of the position of the steering.

This embodiment has the advantage that, for ascertaining the trajectory, it can thereby be specified whether a soft or rather a hard steering behavior is desirable during the drive along the trajectory to be ascertained or of the control profile.

This embodiment further has the advantage that, by specifying the steering rate at the start and at the end of the trajectory, a continuous control rate can be obtained when several trajectories are to be connected to form an overall trajectory.

Corresponding to a further embodiment, the method also provides the determination of a control function of the motor vehicle dependent on the control profile. In this case, the control function is indicative of a desired control of the motor vehicle dependent on the time.

This embodiment has the advantage that a control of the motor vehicle can be permitted from the control profile without any concrete determination of the trajectory.

Corresponding to a further embodiment, the method also provides that the control function has a steering function of the motor vehicle dependent on the control profile. The steering function is indicative of a desired steering of the motor vehicle dependent on the time. The control function further has a speed function of the motor vehicle dependent on the control profile. The speed function is indicative of a desired speed of the motor vehicle dependent on the time.

This embodiment has the advantage that the motor vehicle control can be made possible directly by means of the control profile in order to reach the desired destination position on a defined path, which is modeled according to a motor vehicle driver's driving behavior.

Corresponding to a further embodiment, the method also provides the making available of a secondary-condition set, wherein the secondary-condition set has at least one piece of information concerning a secondary condition of a control of the motor vehicle. The method further provides that the ascertaining of the control profile information moreover takes place dependent on the secondary-condition set.

For the purpose of the invention, a secondary-condition set is a set of information concerning defined values, for example of actuators to be used for the motor vehicle control. These values may, for example, be limit values of these actuators. In this case, this set of information can act as a secondary-condition set for the solver.

This embodiment has the advantage that, by means of it, a control profile can be ascertained that can be navigated even better.

Corresponding to a further embodiment, the method provides that the secondary-condition set is indicative of the limit of a motor vehicle steering, and the secondary-condition set has a first secondary condition, which is indicative of a maximal position of the clockwise steering, and a second secondary condition, which is indicative of a maximal position of the counterclockwise steering.

This embodiment has the advantage that a control profile can thereby be ascertained that can be navigated even better.

The invention thereby permits the determination of a control profile for a motor vehicle in order to reach a desired destination position from a desired starting position. In particular, as a result of a repeated use of the method according to the invention, a control profile can be ascertained for an autonomous motor vehicle, which corresponds to a natural human driving behavior for reaching the destination position. Furthermore, a control profile for the motor vehicle can thereby be ascertained which is unambiguous and navigable.

Established methods do not permit the specification of marginal conditions for the actuators, i.e. to also define the corresponding actuator conditions at the end of the trajectory. Up to now, problems could therefore occur because the resulting end conditions of the actuators may possibly not be suitable for continuing the movement in the desired manner. It could happen, for example, that, although the predefined position and orientation of the vehicle are reached on a straight road at the end of the trajectory, the steering is not in the desired (neutral) position. It would then not be possible to keep on the trajectory that follows. The present invention can eliminate this disadvantage.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
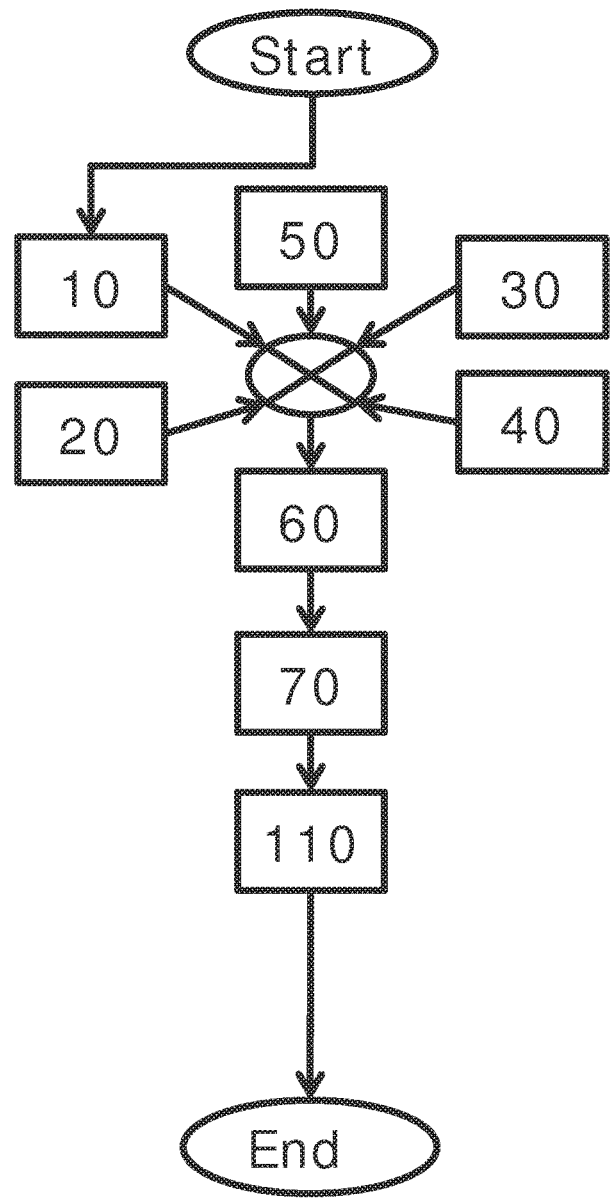
FIG. 1 is a schematic view of an exemplary method according to an embodiment of the invention.

FIG. 1 is a schematic view of a trajectory planning method for ascertaining a control profile for a motor vehicle, particularly for an autonomously driving motor vehicle, the method having the steps of providing a first position set 10, wherein the first position set 10 has at least one piece of information concerning a starting condition at a trajectory start of the trajectory 200; providing a second position set 20, wherein the second position set 20 has at least one piece of information concerning an end condition at a trajectory end of the trajectory 200; providing a first control set 30, wherein the first control set 30 has at least one piece of information concerning a first control condition of the motor vehicle 100 at the trajectory start; providing a second control set 40, wherein the second control set 40 has at least one piece of information concerning a second control condition of the motor vehicle at the trajectory end; providing a vehicle movement modeling function 50, wherein the vehicle movement modeling function has a kinematic movement model of the motor vehicle 100; providing a solver 60 and ascertaining a control profile information set 70 by applying the solver 60 to the vehicle movement modeling function 50 dependent on the first position set 10, on the second position set 20, on the first control set 30 and on the second control set 40, wherein the control profile information set 70 has two profile information values 71, 72. In this case, the profile information values 71, 72 are indicative of the trajectory 200; and determining a control profile 110 for the motor vehicle 100 dependent on the control profile information set 70, wherein the control profile 110 is indicative of the trajectory 100.

Figure 2:
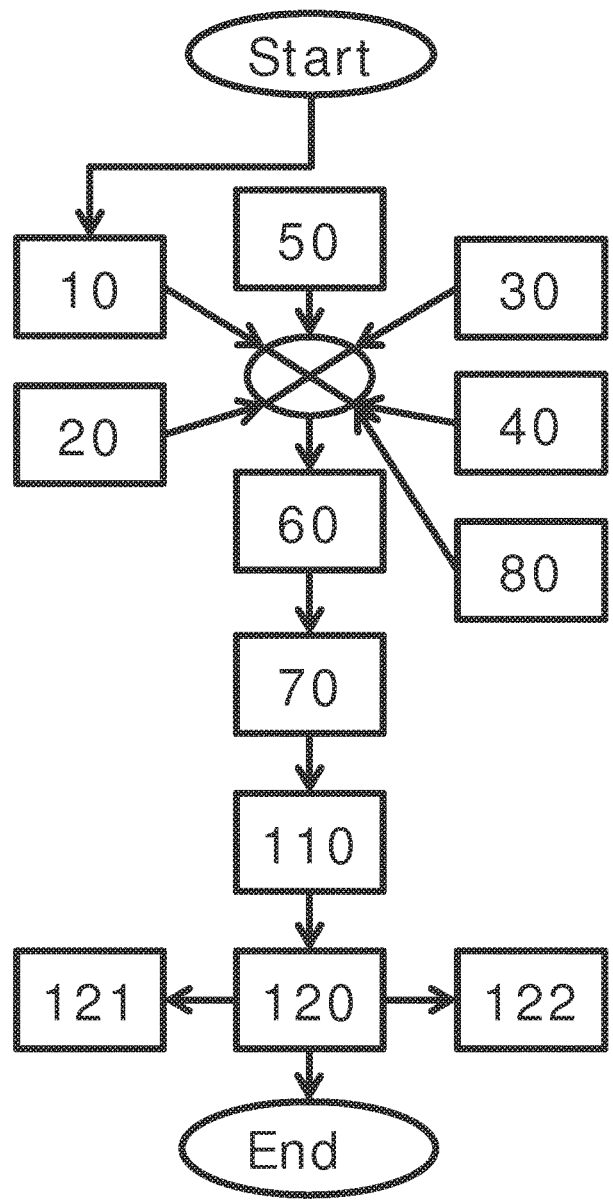
FIG. 2 is a schematic view of an exemplary method according to a further embodiment of the invention.
Figure 3A:
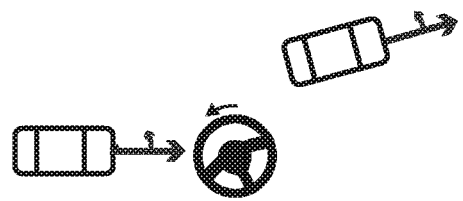
FIGS. 3A-3I are schematic views of a typical steering behavior of a human driver, as it is used for the simulation of the steering behavior according to a further embodiment of the invention.
Figure 3F:
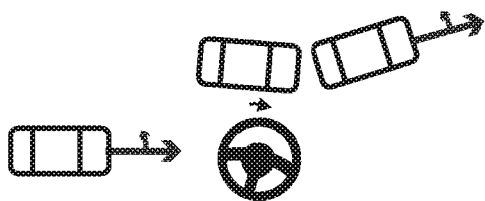
Figure 3B:
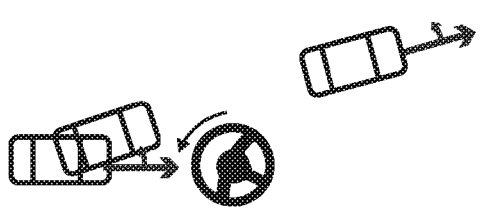
Figure 3G:
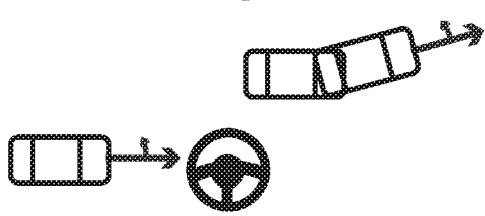
Figure 3C:
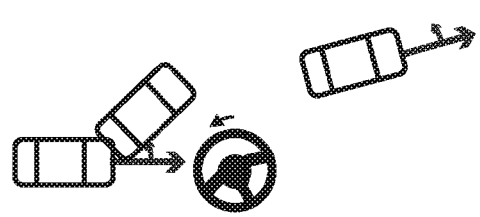
Figure 3H:
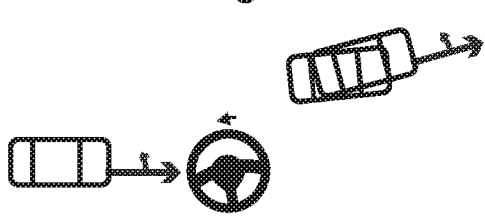
Figure 3D:
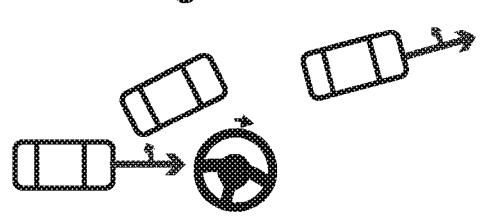
Figure 3I:
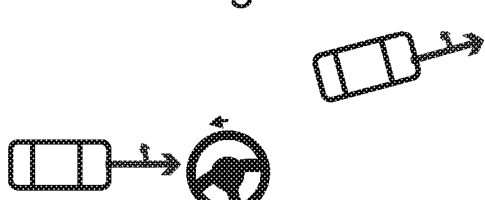
Figure 3E:
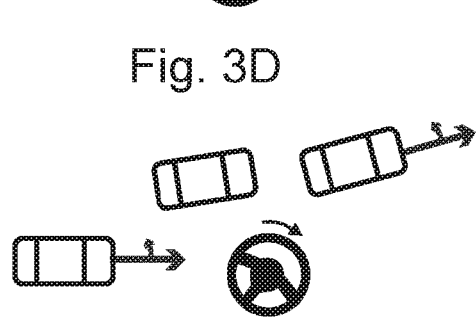

FIG. 2 is a schematic view of another method according to a further embodiment of the invention.

In this case, FIG. 2 is a schematic view of a method which is expanded with respect to the method of FIG. 1. The previous comments with respect to FIG. 1 correspondingly apply to FIG. 2.

As illustrated in FIG. 2, the method also provides the step of determining a control function 120 of the motor vehicle 100 dependent on the control profile 110, wherein the control function 120 is indicative of a desired control of the motor vehicle 100 dependent on the time. The control function 120 further has a steering function 121 of the motor vehicle 100 dependent on the control profile 110 and a speed function 122 of the motor vehicle 100 dependent on of the control profile 110. In this case, the steering function 121 is indicative of a desired steering of the motor vehicle 100 dependent on the time, and the speed function 122 is indicative of a desired speed of the motor vehicle 100 dependent on the time. The method further has the steps of providing a secondary-condition set 80, wherein the secondary-condition set 80 has at least one piece of information concerning a secondary condition of a control of the motor vehicle; the ascertaining of the control profile information set 70 furthermore takes place dependent on the secondary-condition set 80. In addition, the secondary-condition set 80 is indicative of the limit of a motor vehicle steering, and the secondary-condition set 80 has a first secondary condition which is indicative of a maximal position of the clockwise steering, and a second secondary condition which is indicative of a maximal position of the counterclockwise steering.

During the implementation of the solver 60, a dividing of the trajectory 200 into a first region and into a second region can take place (not shown in FIG. 2), wherein the first region is indicative of an approach phase of the motor vehicle 100 to the trajectory end, and wherein the second region is indicative of a correction phase of the motor vehicle 100 before the trajectory end is reached.

FIG. 3 is a schematic view of a human driver's typical steering behavior, as is it used for the simulation of the steering behavior according to a further embodiment of the invention.

FIGS. 3A-3I show the steering behavior of a human driver when approaching a destination. This steering behavior can be divided into an approach phase and into a correction phase. In the example of FIGS. 3A-3I, the approach phase takes place in the steering details "FIG. 3A" to "FIG. 3E", whereas the correction phase takes place in the steering details "FIG. 3F" to "FIG. 3I". During the approach phase, for example, during a parallel parking operation, the driver comes closer to his intended destination, while staying within certain limits, as, for example, maintaining distances from the vehicles situated in front and behind the parking space. During the correction phase which follows, the driver reaches his destination, in the optimal case, with a high precision, in that he, for example parks his motor vehicle in the intended parking space and correspondingly aligns the wheels.

Figure 4:
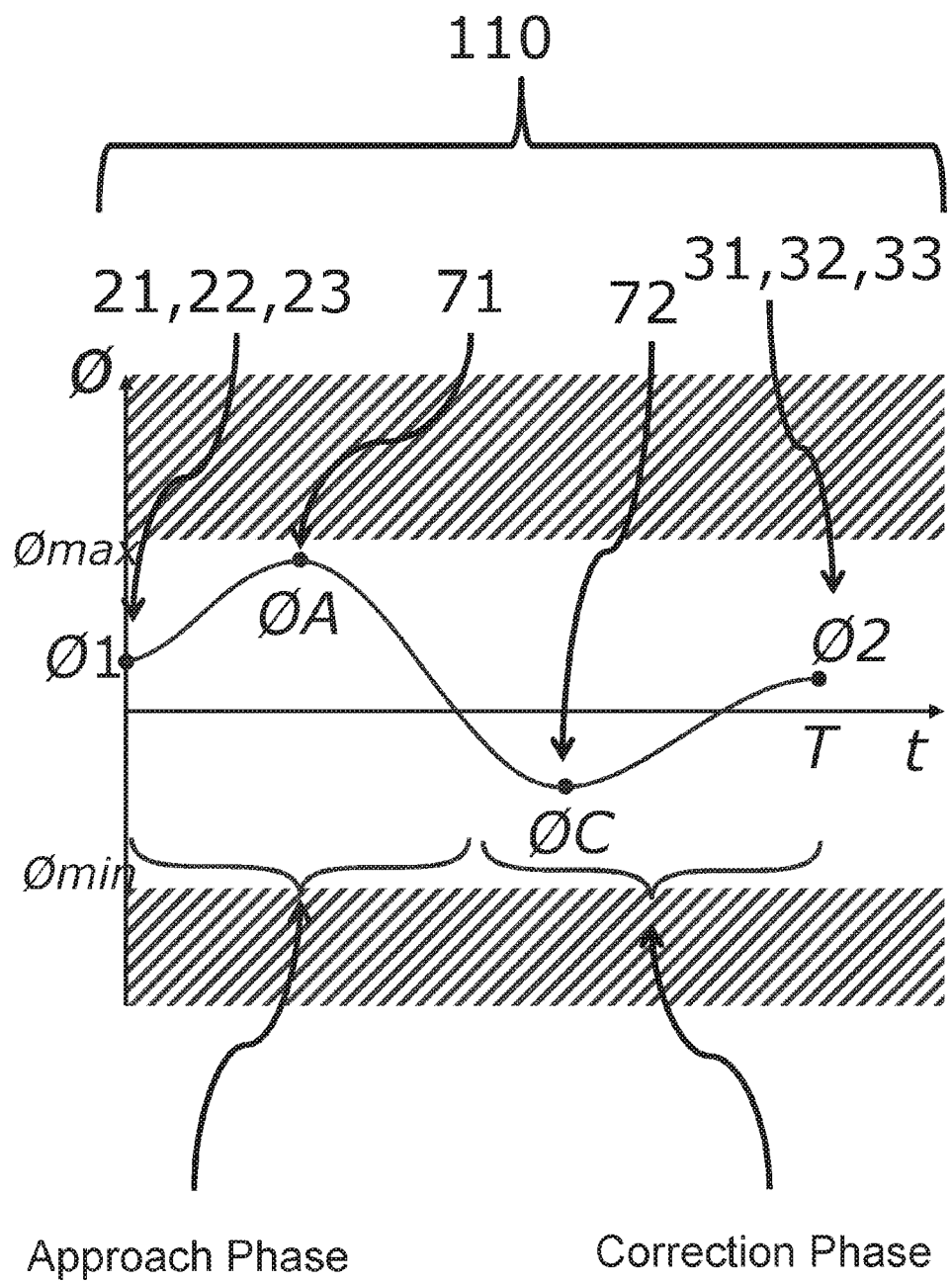
FIG. 4 is a schematic view of a control profile used as an example according to a further embodiment according to the invention.

FIG. 4 is a schematic view of a control profile according to a further embodiment of the invention.

As illustrated in FIG. 4, the first profile information value 71 is in the approach phase, and the second profile information value 72 is in the correction phase.

In this case, the first profile information value 71 of the control profile information set 70 is indicative of a first point with a horizontal tangent of the control profile 110, and the second profile information value 72 of the control profile information set 70 is indicative of a second point with a horizontal tangent of the control profile 110.

Furthermore, the control profile information set 70 has a third profile information value, which is indicative of a route of the trajectory 200. In this case, the time duration T corresponds to the dimension of the control profile 110 in a spatial direction. In this case, the spatial direction corresponds to the timeline t of the control profile. This results in a direct relationship between the route of the trajectory 200 and the time duration T of the trajectory.

The two first spatial coordinates 21, 22 and the first of direction information 23 of the first position set 20 (not shown in FIG. 4) determine the beginning of the control profile 110, whereas the two second spatial coordinates 31, 32 and the second of direction information 33 of the second position set 30 (not shown in FIG. 4) determine the end of the control profile 110.

Figure 5:
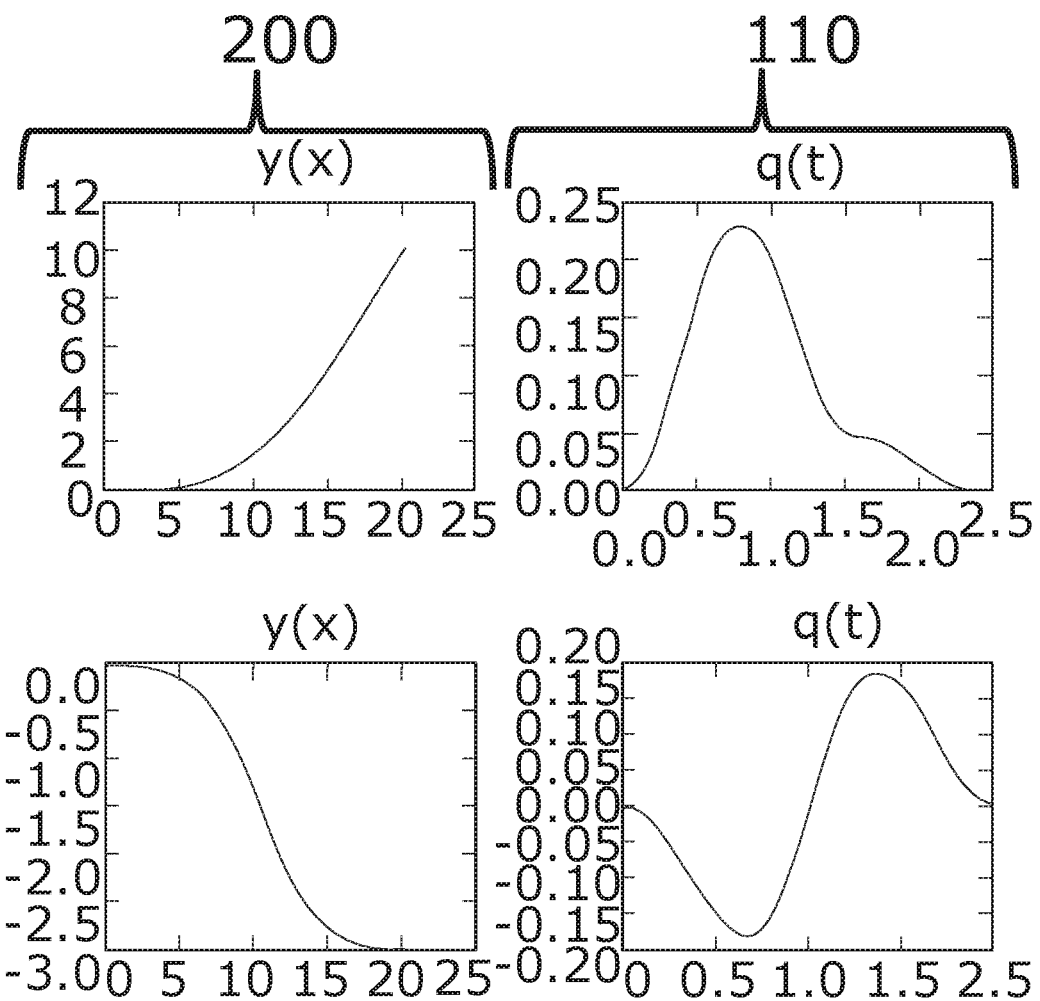
FIG. 5 is a schematic view of three examples of trajectories and respective pertaining control profiles according to a further embodiment of the invention.
Figure 5:
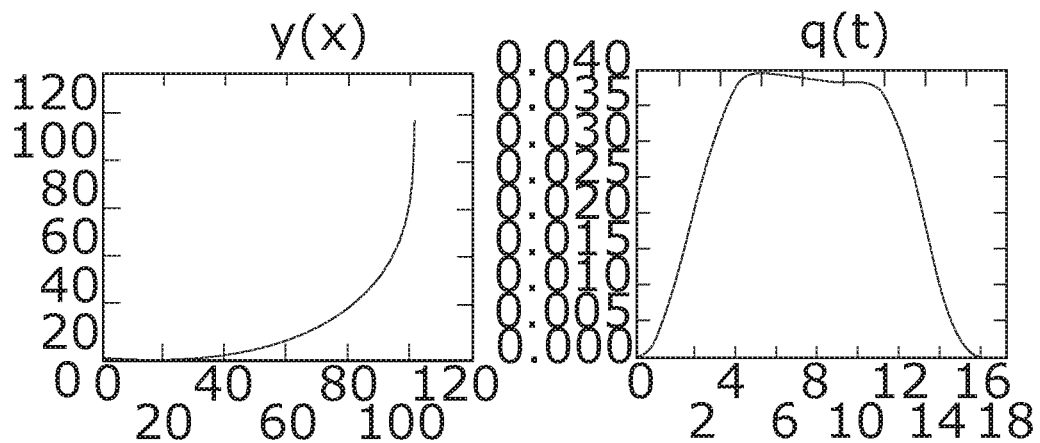

FIG. 5 is a schematic representation of three trajectory examples and respective pertaining control profiles according to a further embodiment of the invention.

In the left half of FIG. 5, three trajectories 200 are illustrated. In the right half of FIG. 5, the respective pertaining steering functions 121 are illustrated.

The uppermost trajectory 200 represents a general driving maneuver in two dimensions. In the center, the trajectory 200 of an example of a lane change is shown. The lower trajectory 200 shows an example of a 90° turn-off operation.

An unambiguous conclusion on a pertaining trajectory 200 can be drawn from a steering function 121 by means of a pertaining speed function 122 (not shown in FIG. 5). It may therefore be sufficient to determine a control profile 110 (not shown in FIG. 5) for a required path without requiring the concrete determination of the corresponding trajectory 200. The path determination can thereby be significantly simplified, and furthermore, this can lead to a path determination, which can better take into account the real physical requirements of the corresponding motor vehicle.

In addition, a control function 120 (not shown in FIG. 5) can be determined from the control profile 110, which control function 120 is indicative of a desired control of the motor vehicle 100 dependent on the time. The control function 120 may have a steering function 121 of the motor vehicle 100 (not shown in FIG. 5) dependent on the control profile 110, wherein the steering function 121 may be indicative of a desired steering of the motor vehicle 100 dependent on the time. Furthermore, the control function 120 may have a speed function 122 (not shown in FIG. 5) of the motor vehicle 100 dependent on the control profile 110, wherein the speed function 122 may be indicative of a desired speed of the motor vehicle dependent on the time.

The idea of the invention can be summarized as follows. A method is provided by means of which a path to be determined can be ascertained, in that a control profile is determined which is indicative of a trajectory which takes into account the real physical requirements of the corresponding motor vehicle. Furthermore, from the control profile, a control function can be directly determined, which has a steering function and a speed function along the path to be traveled, whereby an autonomously driving motor vehicle can be properly controlled to its destination location.

LIST OF REFERENCE NUMBERS

- 10 First position set
- 20 Second position set
- 21, 22 Two first spatial coordinates
- 23 First direction information
- 30 First control set
- 31, 32 Two second spatial coordinates
- 33 Second direction information
- 40 Second control set
- 50 Vehicle movement modeling function
- 60 Solver
- 70 Control profile information set
- 80 Secondary-condition set
- 100 Motor vehicle
- 110 Control profile
- 120 Control function
- 121 Steering function
- 122 Speed function
- 200 Trajectory The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A trajectory planning method for ascertaining a control profile for a motor vehicle, from which a steering function and a speed function of the motor vehicle along a path to be traveled are determined and used to control movement of the motor vehicle using one or more actuators, the method comprising the acts of:
providing a first position set, the first position set having at least one piece of information with respect to a starting condition of a trajectory at a trajectory start of the trajectory;
providing a second position set, the second position set having at least one piece of information with respect to an end condition at a trajectory end of the trajectory;
providing a first control set, the first control set having at least one piece of information with respect to a first control condition of the motor vehicle at the trajectory start;
providing a second control set, the second control set having at least one piece of information with respect to a second control condition of the motor vehicle at the trajectory end;
providing a vehicle movement modeling function, the vehicle movement modeling function having a kinematic movement model of the motor vehicle;
providing a solver;
ascertaining a control profile information set by applying the solver to the vehicle movement modeling function dependent on the first position set, on the second position set, on the first control set and on the second control set, the control profile information set having two profile information values, wherein the two profile information values are indicative of the trajectory; and
determining a control profile for the motor vehicle dependent on the control profile information set without a concrete determination of the trajectory, wherein the control profile is indicative of the trajectory, wherein
the first position set has two first spatial coordinates indicative of a spatial position of the trajectory at the trajectory start, and
the second position set has two second spatial coordinates indicative of a spatial position of the trajectory at the trajectory end.

2. The method according to claim 1, wherein
the first position set has the two first spatial coordinates and a first direction information,
the first direction information is indicative of a tangent of the trajectory at the trajectory start,
the second position set has the two second spatial coordinates and a second direction information, and
the second direction information is indicative of a tangent of the trajectory at the trajectory end.

3. The method according to claim 1, wherein
the first control set has a first control information which is indicative of a position related to steering of the motor vehicle at the trajectory start, and
the second control set has a second control information which is indicative of a position related to the steering of the motor vehicle at the trajectory end.

4. The method according to claim 1, further comprising the act of:
dividing the trajectory into a first region and into a second region, the first region being indicative of an approach phase of the motor vehicle to the trajectory end, and the second region being indicative of a correction phase of the motor vehicle before reaching the trajectory end.

5. The method according to claim 4, wherein
the first profile information value is situated in the approach phase, and the second profile information value is situated in the correction phase.

6. The method according to claim 5, wherein
the first profile information value of the control profile information set is indicative of a first point with a horizontal tangent of the control profile, and
the second profile information value of the control profile information set is indicative of a second point with a horizontal tangent of the control profile.

7. The method according to claim 6, wherein
the control profile information set has a third profile information value, and
the third profile information value is indicative of a route of the trajectory.

8. The method according to claim 3, wherein
the first control set has a third control information, which is indicative of a speed of the motor vehicle at the trajectory start, and
the second control set has a fourth control information, which is indicative of a speed of the motor vehicle at the trajectory end.

9. The method according to claim 8, wherein
the first control set has a fifth control information, which is indicative of a steering rate of the motor vehicle at the trajectory start, and
the second control set has a sixth control information which is indicative of a steering rate of the motor vehicle at the trajectory end.

10. The method according to claim 1, further comprising the act of:
determining a control function of the motor vehicle dependent on the control profile, the control function being indicative of a desired control of the motor vehicle dependent on time.

11. The method according to claim 10, further comprising the acts of:
determining the steering function of the motor vehicle dependent on the control profile, the steering function being indicative of a desired steering of the motor vehicle dependent on time, and
determining the speed function of the motor vehicle dependent the control profile, the speed function being indicative of a desired speed of the motor vehicle dependent on time.

12. The method according to claim 1, further comprising the act of:
providing a secondary-condition set, the secondary-condition set having at least one piece of information concerning a secondary condition of a control of the motor vehicle, and
the ascertaining of the control profile information set further takes place dependent on the secondary-condition set.

13. The method according to claim 12, wherein the secondary-condition set is indicative of the limit of a motor vehicle steering, and the secondary-condition set has:
(a) a first secondary condition which is indicative of a maximal position of the clockwise steering, and
(b) a second secondary condition which is indicative of a maximal position of the counterclockwise steering.

14. The method according to claim 1, wherein the determined control profile is for an autonomously driving motor vehicle.

* * * * *